US012703143B2

(12) United States Patent
Chen et al.

(10) Patent No.: US 12,703,143 B2
(45) Date of Patent: Aug. 11, 2026

(54) THREE-DIMENSIONAL PRINTING WITH GLYCIDYL COMPOUNDS

(71) Applicant: PERIDOT PRINT LLC, Palo Alto, CA (US)

(72) Inventors: Tienteh Chen, San Diego, CA (US); Christina Gissel Rodriguez, San Diego, CA (US); Benjamin Abelovski, San Diego, CA (US)

(73) Assignee: Peridot Print LLC, Palo Alto, CA (US)

( * ) Notice: Subject to any disclaimer, the term of this patent is extended or adjusted under 35 U.S.C. 154(b) by 694 days.

(21) Appl. No.: 17/637,580

(22) PCT Filed: Oct. 10, 2019

(86) PCT No.: PCT/US2019/055557
§ 371 (c)(1),
(2) Date: Feb. 23, 2022

(87) PCT Pub. No.: WO2021/071492
PCT Pub. Date: Apr. 15, 2021

(65) Prior Publication Data
US 2022/0274174 A1 Sep. 1, 2022

(51) Int. Cl.
*B29C 64/165* (2017.01)
*B22F 1/103* (2022.01)
(Continued)

(52) U.S. Cl.
CPC ............ *B29C 64/165* (2017.08); *B22F 1/103* (2022.01); *B22F 10/14* (2021.01); *B22F 12/40* (2021.01);
(Continued)

(58) Field of Classification Search
CPC ....... B29C 64/165; B22F 1/103; B33Y 70/00; C08L 33/08
See application file for complete search history.

(56) References Cited

U.S. PATENT DOCUMENTS 5,077,165 A * 12/1991 Kato .................... G03G 5/0589 430/49.6
9,969,930 B2 5/2018 Florio et al.
(Continued)

FOREIGN PATENT DOCUMENTS

CA 3054300 A1 * 8/2018 ............. B33Y 10/00
CN 107325770 11/2017
(Continued)

OTHER PUBLICATIONS

Ligon, S. C. et al., Polymers for 3d Printing and Customized Additive Manufacturing, Jul. 30, 2017, http://pubs.acs.org/doi/full/10.1021/acs.chemrev.7b00074.

*Primary Examiner* — Nicholas A Wang
(74) *Attorney, Agent, or Firm* — Dierker & Kavanaugh, P.C.

(57) ABSTRACT

The present disclosure describes binder agents for printing three-dimensional green body objects, three-dimensional printing kits, and methods of three-dimensional printing. In one example, a binder agent for printing a three-dimensional green body object can include water, an organic co-solvent, a glycidyl compound having two or more glycidyl groups per molecule, and latex particles. The latex particles can include polymerized monomers. The polymerized monomers can include a first monomer having an acid group, and a second monomer having a vinyl group and without an acid group.

20 Claims, 2 Drawing Sheets

300 iteratively applying individual build material layers of a particulate build material including from about 80 wt% to about 100 wt% metal particles — 310 based on a 3D object model, selectively applying a binder agent to the individual build material layers to define layers of a 3D green body object, wherein the binder agent includes water, an organic co-solvent, a glycidyl compound having two or more glycidyl groups per molecule, and latex particles including polymerized monomers including a first monomer having an acid group, and a second monomer having a vinyl group and without an acid group — 320 heating the 3D green body object to drive off water and further solidify the 3D green body object — 330

(51) Int. Cl.

| | |
|---|---|
| ***B22F 10/14*** | (2021.01) |
| ***B22F 12/40*** | (2021.01) |
| ***B33Y 10/00*** | (2015.01) |
| ***B33Y 30/00*** | (2015.01) |
| ***B33Y 70/00*** | (2020.01) |
| ***C08L 33/08*** | (2006.01) |

(52) U.S. Cl.

CPC ............... *B33Y 10/00* (2014.12); *B33Y 30/00* (2014.12); *B33Y 70/00* (2014.12); *C08L 33/08* (2013.01); *B22F 2304/10* (2013.01)

(56) References Cited

U.S. PATENT DOCUMENTS

| | | | | |
|---|---|---|---|---|
| 2016/0032118 | A1* | 2/2016 | Morris ....................... | B41J 2/01<br>347/85 |
| 2016/0160021 | A1* | 6/2016 | Kojima ................... | B22F 10/14<br>425/375 |
| 2017/0251713 | A1 | 9/2017 | Warner et al. | |
| 2021/0187612 | A1* | 6/2021 | Kasperchik ............ | B33Y 30/00 |

FOREIGN PATENT DOCUMENTS

| | | | | | |
|---|---|---|---|---|---|
| CN | 107325770 | A | * | 11/2017 | |
| JP | 2000211262 | A | | 8/2000 | |
| WO | WO2018156938 | | * | 8/2018 | |
| WO | WO-2019009906 | A1 | * | 1/2019 | .............. B22F 10/14 |
| WO | WO-2019025472 | A1 | | 2/2019 | |

* cited by examiner

THREE-DIMENSIONAL PRINTING WITH GLYCIDYL COMPOUNDS

BACKGROUND

Three-dimensional (3D) printing may be an additive printing process used to make three-dimensional solid parts from a digital model. Three-dimensional printing is often used in rapid product prototyping, mold generation, mold master generation, and short run manufacturing. Some three-dimensional printing techniques are considered additive processes because they involve the application of successive layers of build material. This is unlike other machining processes, which often rely upon the removal of material to create the final part. Some three-dimensional printing methods use chemical binders or adhesives to bind build materials together. Other three-dimensional printing methods involve sintering or partial sintering, melting, etc., of the build material. For some three-dimensional printing methods, melting or partial melting of build material may be accomplished using heat-assisted extrusion, and for some other materials (e.g., polymerizable materials), curing may be accomplished using, for example, ultra-violet light or infrared light.

DETAILED DESCRIPTION

Figure 1:
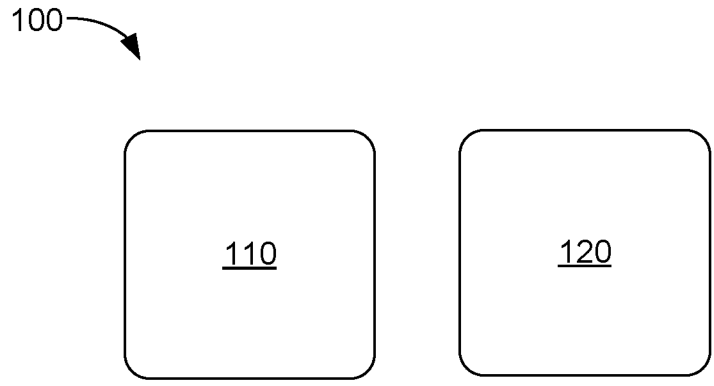
FIG. 1 schematically illustrates an example three-dimensional printing kit in accordance with the present disclosure.

The present disclosure describes materials and methods that can be used to form three-dimensional (3D) printed objects from a metal powder build material. The three-dimensional printing processes described herein can be used to form a green body of metal particle bound together with a binder. The green body can subsequently be sintered to form a durable metal three-dimensional printed object. In one example, a binder agent for printing a three-dimensional green body object includes water, an organic co-solvent, a glycidyl compound having two or more glycidyl groups per molecule, and latex particles. The latex particles include polymerized monomers that include a first monomer having an acid group, and a second monomer having a vinyl group and without an acid group. In some examples, the glycidyl compound can have a molecular weight from about 100 g/mol to about 1,000 g/mol. In certain examples, the glycidyl compound can be glycerol diglycidyl ether, neopentyl glycol diglycidyl, trimethylolpropane triglycidyl ether, polyethylene glycidyl ether, glycidyl triglycerol ether, 1,4-butanediol diglycidyl ether, or a combination thereof. In further examples, the glycidyl compound can be present in an amount from about 0.1 wt % to about 25 wt % with respect to the total weight of the binding agent. In other examples, the first monomer can include acrylic acid, methacrylic acid, itaconic acid, carboxyethyl acrylate, carboxyethyl methacrylate, carboxypropyl acrylate, carboxypropyl methacrylate, or a combination thereof, and the second monomer can include C1-C20 linear or branched alkyl acrylate, C1-C20 linear or branched alkyl methacrylate, alicyclic acrylate, alicyclic methacrylate, styrene, methyl styrene, polyol acrylate, polyol methacrylate, hydroxyethyl acrylate, hydroxyethyl methacrylate, or a combination thereof. In still further examples, the latex particles can be present in an amount from about 1 wt % to about 20 wt % and the organic co-solvent can be present in amount from about 15 wt % to about 40 wt %.

The present disclosure also describes three-dimensional printing kits. In one example, a three-dimensional printing kit includes a particulate build material and a binder agent. The particulate build material includes from about 80 wt % to about 100 wt % metal particles. The binder agent includes water, an organic co-solvent, a glycidyl compound having two or more glycidyl groups per molecule, and latex particles. The latex particles include polymerized monomers including a first monomer having an acid group, and a second monomer having a vinyl group and without an acid group. In some examples, the metal particles can include aluminum, titanium, copper, cobalt, chromium, nickel, vanadium, tungsten, tungsten carbide, tantalum, molybdenum, magnesium, gold, silver, ferrous alloy, stainless steel, steel, an alloy thereof, or an admixture thereof. In certain examples, the metal particles have a D50 particle size of from about 4 μm to about 150 μm. In further examples, the glycidyl compound is glycerol diglycidyl ether, neopentyl glycol diglycidyl, trimethylolpropane triglycidyl ether, polyethylene glycidyl ether, glycidyl triglycerol ether, 1,4-butanediol diglycidyl ether, or a combination thereof. In certain examples, the glycidyl compound can be present in an amount from about 0.1 wt % to about 25 wt % with respect to the total weight of the binding agent.

The present disclosure also describes methods of three-dimensional printing. In one example, a method of three-dimensional printing includes iteratively applying individual build material layers of a particulate build material including from about 80 wt % to about 100 wt % metal particles. A binder agent is selectively applied to the individual build material layers based on a three-dimensional object model to define layers of a three-dimensional green body object. The binder agent includes water, an organic co-solvent, a glycidyl compound having two or more glycidyl groups per molecule, and latex particles that include polymerized monomers including a first monomer having an acid group, and a second monomer having a vinyl group and without an acid group. The three-dimensional green body object is heated to drive off water and further solidify the three-dimensional green body object. In some examples, the glycidyl compound can be glycerol diglycidyl ether, neopentyl glycol diglycidyl, trimethylolpropane triglycidyl ether, polyethylene glycidyl ether, glycidyl triglycerol ether, 1,4-butanediol diglycidyl ether, or a combination thereof. In other examples, the heating can include heating at from about 100° C. to about 250° C. for about 5 minutes to about 8 hours. In further examples, the method can also include sintering the three-dimensional green body object in a sintering oven at a peak temperature from about 600° C. to about 3,500° C. for a period of time from about 1 hour to about 30 hours to sinter the metal particles together.

The materials and processes described herein can be used to form a three-dimensional green body object made up particulate build material held together by a binder. In certain examples, the three-dimensional green body can be formed by depositing thin layers of the particulate build material in a powder bed and then jetting a binder agent onto the layers to form individual slices of the three-dimensional green body. After forming one slice of the three-dimensional green body in this way, a new layer of particulate build material can be deposited on the powder bed and the next slice can be formed by jetting the binder agent, and this can be repeated until a complete three-dimensional green body is formed. The binder agent can include latex particles as mentioned above. In some examples, the binder can form a polymeric matrix holding the metal particles of the particulate build material together. In some cases, after forming all the slices of the green body in the powder bed, the green body can be strengthened by heating to a curing temperature to coalesce the latex particles together to form the polymeric matrix. Without being bound to a particular mechanism, in some examples the latex particles may dissolve in solvents included in the binder agent, and then the solvents may evaporate at the curing temperature to leave behind a polymeric matrix. In other examples, the latex particles may melt and soften sufficiently to coalesce and form a polymeric matrix at the curing temperature. The curing temperature can be lower than the sintering temperature at which the metal particles of the particulate build material will sinter together. Accordingly, the final three-dimensional green body object can include discrete metal particles bound together by a polymer matrix.

In some cases, the three-dimensional green body object can have sufficient strength to hold its own shape until the time that the three-dimensional green body object is sintered to form a final metal three-dimensional printed object. In further examples, the three-dimensional green body object can be sufficiently strong to withstand any processing and handling that occurs before sintering. For example, the three-dimensional green body object can be removed from the powder bed and cleaned to remove any loose build material particles that have become caked or weakly attached to the surface of the three-dimensional green body object. In some examples, this cleaning can be performed by brushing, sandblasting, or other methods. If the three-dimensional green body object does not have sufficient strength that these processes can break off parts of the three-dimensional green body object, destroy surface details of the three-dimensional green body object, and so on.

Increasing the tensile strength of the three-dimensional green body objects can allow for three-dimensional printing more complex and larger objects. The binder agents described herein can increase the green body strength compared to three-dimensional green body objects made with previous binder agent compositions. In particular, it has been found that glycidyl compounds having two or more glycidyl groups per molecule can be included in the binder agent together with latex particles that include polymerized acid monomers and non-acid containing monomers. This combination can provide increased green body strength. Without being bound to a particular mechanism, in some examples the glycidyl compound can react with acid groups of the latex to from crosslinking between the latex particles.

The green body objects formed using the methods described herein can have increased strength and can be removed from the powder bed and prepared for final sintering with less risk of breakage. Final sintering can include exposing the green body object to heat to sinter the metal particles of the particulate build material together and form a sintered three-dimensional printed object. The temperature at which the green body object is heated to sinter the metal particles and form the final three-dimensional printed object is referred to herein as the sintering temperature. In some examples, the polymeric latex binder can thermally decompose or be burned off during the sintering process.

It is noted that when discussing the binder agents, three-dimensional printing kits, and methods of three-dimensional printing herein, these discussions can be considered applicable to one another whether or not they are explicitly discussed in the context of that example. Thus, for example, when discussing a binder agent related to a three-dimensional printing kit, such disclosure is also relevant to and directly supported in the context of methods of three-dimensional printing, vice versa, etc.

It is also understood that terms used herein will take on their ordinary meaning in the relevant technical field unless specified otherwise. In some instances, there are terms defined more specifically throughout the specification or included at the end of the present specification, and thus, these terms have a meaning as described herein.

Binder Agents

Figure 3:
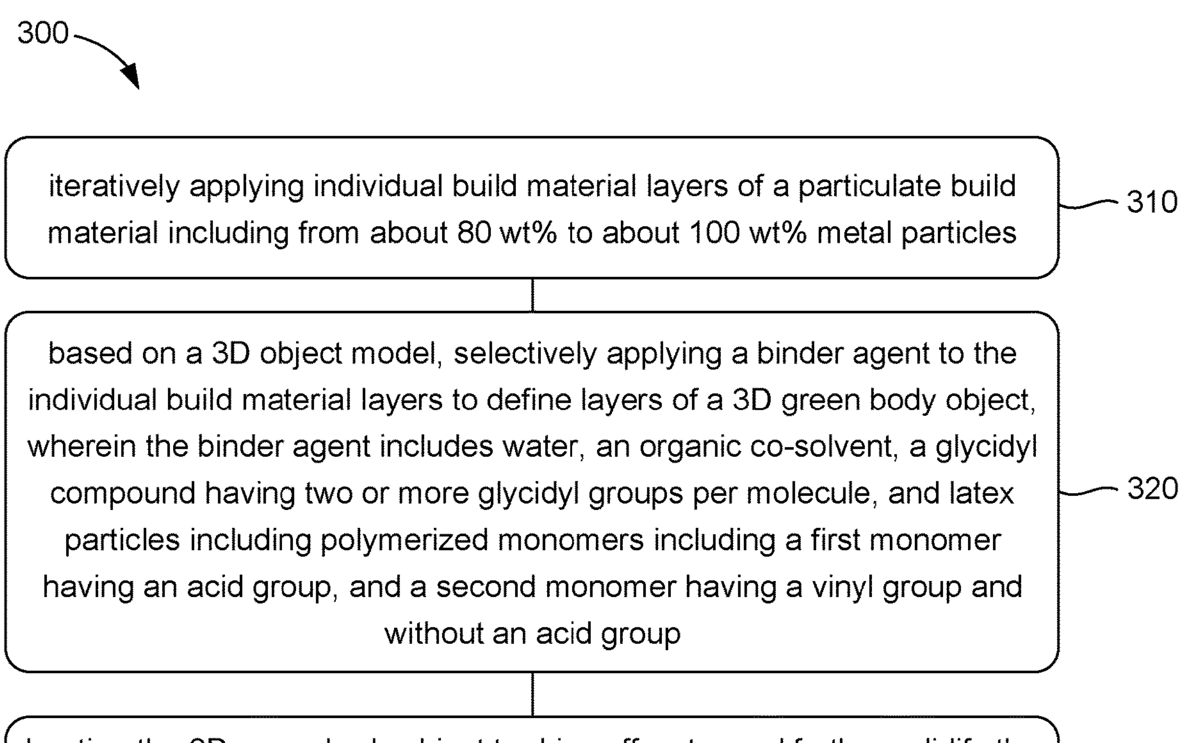
FIG. 3 is a flow diagram illustrating an example method of three-dimensional printing in accordance with the present disclosure.

The binder agents 120 described herein can be used in three-dimensional printing kits 100, such as the three-dimensional printing kits and systems shown in FIG. 1, as well as in the methods 300 of three-dimensional printing shown in FIG. 3. In some examples, the binder agents can include latex particles and a glycidyl compound that has two or more glycidyl groups per molecule. The latex particles can include polymerized monomers including a first monomer having an acid group and a second monomer having a vinyl group and without an acid group. The binder agent can also include additional ingredients.

In some examples, the binder agent can be an aqueous fluid in the form of an aqueous dispersion or solution carried by an aqueous liquid vehicle. The aqueous liquid vehicles can make up about 60 wt % to about 99 wt % of the binder agent in some examples. In other examples, the aqueous liquid vehicle can be included in the binder agent at from about 60 wt % to about 85 wt %, from about 60 wt % to about 80 wt %, from about 75 wt % to about 90 wt %, or from about 70 wt % to about 80 wt %, based on a total weight of the binder agent.

In some examples, the aqueous liquid vehicle(s) can include water, co-solvents, dispersing agents, biocides, viscosity modifiers, pH adjusters, sequestering agents, preservatives, and the like. In one example, water can be present at from about 30 wt % to 100 wt % of the liquid vehicle component based on a total weight of the aqueous liquid vehicle. In other examples, the water can be present at from about 60 wt % to about 95 wt %, from about 75 wt % to 100 wt %, or from about 80 wt % to about 99 wt %, based on a total weight of the aqueous liquid vehicle.

The co-solvent can be present at from about 0.5 wt % to about 50 wt % in the aqueous liquid vehicle, based on a total weight of the binder agent. In other examples, the co-solvent can be present at from about 15 wt % to about 40 wt % or from about 20 wt % to about 30 wt %. In some examples, the co-solvent can be a high boiling point solvent, which can have a boiling point of about 110° C. or greater. In some examples, the high boiling point co-solvent can have a boiling point from about 110° C. to about 300° C. Example co-solvents can include aliphatic alcohols, aromatic alcohols, alkyl diols, glycol ethers, polyglycol ethers, 2-pyrrolidinones, caprolactams, formamides, acetamides, long chain alcohols, and combinations thereof. For example, the co-solvent can include aliphatic alcohols with a $—CH_2OH$ group, secondary aliphatic alcohols, 1,2-alcohols, 1,3-alcohols, 1,5-alcohols, ethylene glycol alkyl ethers, propylene glycol alkyl ethers, C6 to C12 homologs of polyethylene glycol alkyl ethers, N-alkyl caprolactams, unsubstituted caprolactams, both substituted and unsubstituted formamides, both substituted and unsubstituted acetamides, combinations thereof, and the like. Other example organic co-solvents can include propyleneglycol ether, dipropyleneglycol monomethyl ether, dipropyleneglycol monopropyl ether, dipropyleneglycol monobutyl ether, tripropyleneglycol monomethyl ether, tripropyleneglycol monobutyl ether, dipropyleneglycol monophenyl ether, 2-pyrrolidinone, 2-methyl pyrrolidone, 2-ethyl pyrrolidone, 2-methyl-1,3-propanediol, and combinations thereof.

If a surfactant is included, examples can include Surfynol® SEF, Surfynol® 104, Surfynol® 420, Surfynol® 440, Surfynol® 465, Surfynol® 480, Surfynol® 2502, or Surfynol® 440, Dynol® 604, Dynol® 607, Dynol® 307 (Evonik Industries AG, Germany); Crodafos™ N3 Acid or Brij® 010 (Croda International Plc., United Kingdom); Tergitol® TMN6, Tergitol® 15S5, Tergitol® 15S7, Dowfax® 2A1, or Dowfax® 8390 (Dow, USA); or a combination thereof. The surfactant or combinations of surfactants can be present in the binder agent at from about 0.1 wt % to about 5 wt % based on the total weight of the binder agent, and in some examples, can be present at from about 0.5 wt % to about 2 wt %.

With respect to antimicrobials, any compound suitable to inhibit the growth of harmful microorganisms can be included. These additives may be biocides, fungicides, and other microbial agents. Examples of suitable microbial agents can include, but are not limited to, Nuosept® (Troy, Corp., USA), Ucarcide™, Kordek™, Rocima™, Kathon™ (all available from The Dow Chemical Co., USA), Vancide® (R.T. Vanderbilt Co., USA), Proxel® (Arch Chemicals, USA), Acticide® B20 and Acticide® M20 and Acticide® MBL (blends of 2-methyl-4-isothiazolin-3-one (MIT), 1,2-benzisothiazolin-3-one (BIT), and Bronopol® (Thor Chemicals, United Kingdom); Axide™ (Planet Chemical, Singapore); Nipacide™ (Clariant, Switzerland), etc. Sequestering agents such as EDTA (ethylene diamine tetra acetic acid) may be included to eliminate the deleterious effects of heavy metal impurities, and buffer solutions may be used to control the pH of the ink. Viscosity modifiers and buffers may also be present, as well as other additives to modify properties of the respective fluids.

In some examples, the aqueous liquid vehicle(s) can include from about 0.1 wt % to about 1 wt % of an anti-kogation agent, based on a total weight percentage of the binder agent. Kogation refers to the deposit of dried solids on a printhead. An anti-kogation agent can be included to prevent the buildup of dried solids on the printhead. Examples of suitable anti-kogation agents can include oleth-3-phosphate (commercially available as Crodafos™ O3A or Crodafos™ N-3 acid), dextran 500 k, Crodafos™ HCE (phosphate-ester from Croda Int.), Crodafos® N10 (oleth-10-phosphate from Croda Int., United Kingdom), or Dispersogen® LFH (polymeric dispersing agent with aromatic anchoring groups, acid form, anionic, from Clariant, Switzerland), etc.

Three-Dimensional Printing Kits

In further examples, three-dimensional printing kits can include the binder agent described above and a particulate build material. In further detail, as shown in FIG. 1, an example three-dimensional printing kit 100 can include a particulate build material 110 and a binder agent 120. The particulate build material can include from about 80 wt % to about 100 wt % metal particles. The binder agent can include any of the ingredients described herein. In a particular example, the binder agent can include water, an organic co-solvent, a glycidyl compound having two or more glycidyl groups per molecule, and latex particles. The latex particles can include polymerized monomers including a first monomer having an acid group, and a second monomer having a vinyl group and without an acid group.

Figure 2:
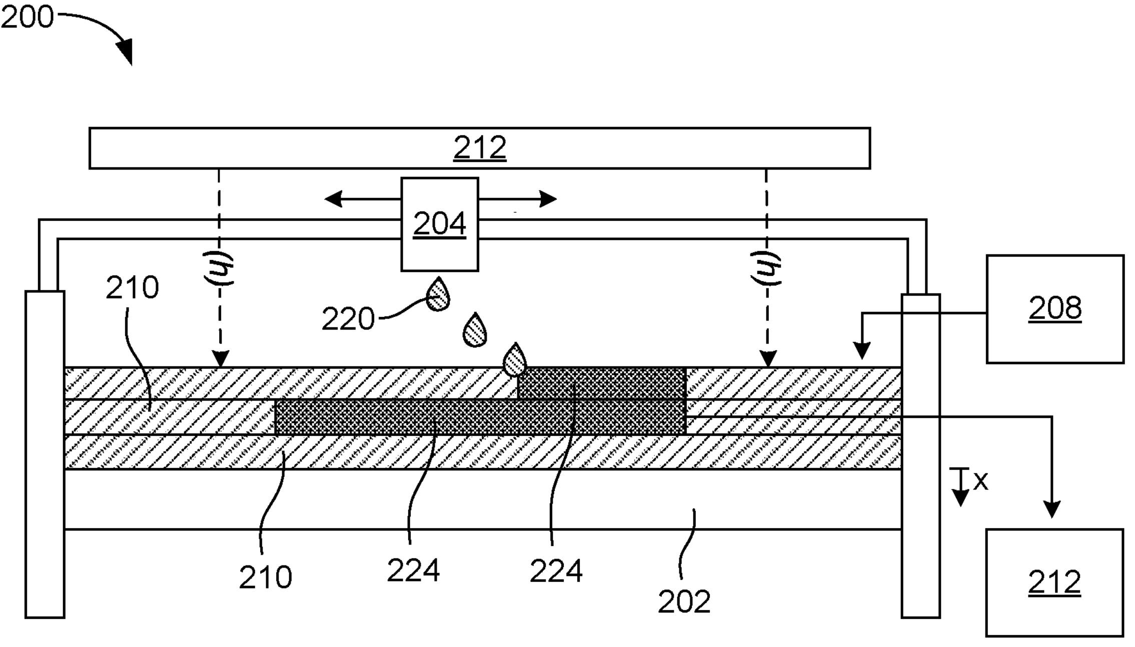
FIG. 2 graphically illustrates an example three-dimensional printing kit in example use in accordance with the present disclosure.

FIG. 2 shows an example three-dimensional printing kit 200 being used in a three-dimensional printing system to form a green body object. In this example, the particulate build material 210 is deposited from a particulate build material source 208 onto a build platform 202 where the particulate build material can be flattened or smoothed, such as by a mechanical roller or other flattening technique. In this example, the binder agent 220 includes water, an organic co-solvent, a glycidyl compound having two or more glycidyl groups per molecule, and latex particles as described herein. The latex particles can include polymerized monomers including a first monomer having an acid group and a second monomer having a vinyl group and without an acid group. The binder agent can be ejected onto the particulate build material from a fluid ejector 204, for example, to provide for selectively patterning the particulate build material. The binder agent can be ejected onto an area of the powder bed that corresponds to a layer of a three-dimensional printed object, such as from a three-dimensional object model or computer model. Heat (h) can be used, such as from a heat source 212, at the various layers (or group of layers, or after the three-dimensional green body object is formed) to remove solvent from the binder agent and coalesce the latex particles from the binder agent, which can assist with more rapid solidification of individual layers. In one example, heat can be applied from overhead (e.g., prior to application of the next layer of particulate build material, or after multiple layers are formed, etc.), and/or can be provided by the build platform from beneath the particulate build material and/or from the particulate build material source (preheating particulate build material prior to dispensing on the build platform or previously applied three-dimensional object layer). After individual layers are printed with binder agent, the build platform can be dropped a distance of (x), which can correspond to the thickness of a printed layer in one example, so that another layer of the particulate build material can be added thereon and printed with the binder agent, etc. The process can be repeated on a layer by layer basis until a green body is formed that is stable enough to move to an oven suitable for fusing, e.g., sintering, annealing, melting, or the like. The green body in this example includes a three-dimensional object formed from solidified green body object layers 224, which include both particulate build material and binder agent that delivers the latex particles thereto.

The fluid ejector(s) can deposit fluid(s) in a layer that corresponds to the layers of the three-dimensional object, and can be used to form a green body three-dimensional object in any orientation. For example, the three-dimensional object can be printed from bottom to top, top to bottom, on its side, at an angle, or any other orientation. The orientation of the three-dimensional object can also be formed in any orientation relative to the layering of the particulate build material. For example, the three-dimensional object can be formed in an inverted orientation or on its side relative to the build layering within the particulate build material. The orientation of build or the orientation of the three-dimensional object to be built within the particulate build material can be selected in advance or even by the user at the time of printing, for example.

After forming the green body object, the article can be removed from particulate build material to be fused in a sintering or annealing oven 212, for example. The oven can raise the temperature of the green body object sufficient to sinter the article, e.g., at a temperature ranging from about 600° C. to about 3,500° C., depending melting or sintering temperature of the particulate build material selected for use.

Methods of Three-Dimensional Printing

In another example, as shown in FIG. 3, a method 300 of three-dimensional printing can include: iteratively applying individual build material layers of a particulate build material including from about 80 wt % to about 100 wt % metal particles 310; based on a three-dimensional object model, selectively applying a binder agent to the individual build material layers to define layers of a three-dimensional green body object, wherein the binder agent includes water, an organic co-solvent, a glycidyl compound having two or more glycidyl groups per molecule, and latex particles including polymerized monomers including a first monomer having an acid group, and a second monomer having a vinyl group and without an acid group 320; and heating the three-dimensional green body object to drive off water and further solidify the three-dimensional green body object 330.

Following application of the binder agent, the particulate build material and fluid(s) applied thereto can be heated to an elevated temperature to assist with solidifying the three-dimensional green body object in preparation for moving to a sintering oven. In one example, heating can be carried out at from about 100° C. to about 250° C., about 120° C. to about 220° C., or about 150° C. to about 200° C. for time sufficient to solidify or stabilize the green body for movement to a sintering oven. Time frames for heating individual layers may be short, e.g., from about 0.5 second to about 120 seconds, for example. If heating the green body after it is fully formed, time frames can vary as well, depending on size of the green body, e.g., large objects with a smaller surface to volume ratio may take longer to drive off enough fluid to stabilize the green body than a smaller object with a larger surface to volume ratio. That stated, time frames for heating the green body after formation can be from about 5 minutes to about 8 hours, or from about 5 minutes to about 2 hours, or from about 30 minutes to about 8 hours, or from about 60 minutes to about 4 hours, or from about 2 hours to about 3 hours, or from about 30 minutes to about 3 hours. In many cases, individual layers can be heated during the build, and furthermore, additional heating can occur after the green body is fully formed. In other words, one goal may be to generate a green body object that is stable enough to be separated from surrounding metal powder and to be moved to a sintering oven. In one specific example, it may be efficient to not fully cure every individual layer prior to applying the next green body layer, but rather coalesce the latex particles during printing (with perhaps some curing), and after building the green body as a whole or after building a large portion of the green body, e.g., 25% or more of the green body part, heating the green body further while still supported within the particulate build material. Depending on the size of the green body part or large portion thereof, heating after building can occur for about 5 minutes to about 8 hours, or from about 5 minutes to about 2 hours, or from about 30 minutes to about 3 hours, for example, as mentioned previously.

Upon curing or otherwise binding of the particulate build material by the latex particles, the three-dimensional green body object with enhanced tensile strength can be moved to a heating device, such as a sintering oven. In one example, the heating can be a temperature ranging from about 500° C. to about 3,500° C., including at a temperature within the range where the metal particles are sintered together. In another example, the temperature can range from about 600° C. to about 1,500° C., or from about 800° C. to about 1200° C., or from about 1,000° C. to about 2,000° C. In further detail, the sintering temperature range can vary, depending on the material, but in one example, the sintering temperature can range from about 10° C. below the melting temperature of the metal particles of the particulate build material to about 50° C. below the melting temperature of the metal particles of the particulate build material. In another example, the sintering temperature can range from about 100° C. below the melting temperature of the metal particles of the particulate build material to about 200° C. below the melting temperature of the metal particles of the particulate build material. The sintering temperature can depend upon the particle size and period of time that heating occurs, e.g., at a high temperature for a sufficient time to cause particle surfaces to become physically merged or composited together. For example, a sintering temperature for stainless steel can be about 1400° C. and an example of a sintering temperature for aluminum or aluminum alloys can range from about 550° C. to about 620° C. Temperatures outside of these ranges can be used as determined on a case by case basis. The sintering time can be from about 1 hour to about 30 hours, in some examples. In other examples, the sintering time can be from about 5 hours to about 30 hours, or from about 10 hours to about 24 hours, or from about 12 hours to about 18 hours.

In certain examples, the 3D green body object can be gradually heated from the curing temperature to the fusing or sintering temperature. In some examples, the polymer binder and any other organic materials can thermally decompose in the temperature range from about 300° C. to about 500° C. This can be referred to as debinding. The debinded object can then continue to be heated to the sintering or fusing temperature.

During heating in the oven, the heating device can include an inert atmosphere to avoid oxidation of the metal particles. In one example, the inert atmosphere can be oxygen-free and can include a noble gas, an inert gas, or combination thereof. For example, the inert atmosphere can include a noble gas or an inert gas selected from argon, nitrogen, helium, neon, krypton, xenon, radon, hydrogen, or a combination thereof. Upon removal of the fused three-dimensional object from the oven and cooling (or annealing by controlling the cool down rate in the oven), the fused three-dimensional object can be treated or polished, such as by sand blasting, bead blasting, air jetting, tumble finishing such as barrel finishing, vibratory finishing, or a combination thereof. Tumble or vibratory finishing techniques can be performed wet (involving liquid lubricants, cleaners, or abrasives) or dry.

Glycidyl Compounds

The glycidyl compound used in the binder agents described herein can be an organic compound that includes two or more glycidyl groups. As used herein, "glycidyl group" refers to the functional group having the following chemical structure:

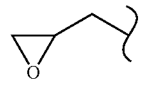

The glycidyl group includes an epoxide ring bonded to a methylene group. The methylene group connects to the remainder of the organic compound. In some examples, the glycidyl group can chemically react with acid groups, such as carboxylic acid groups, in the latex polymer. Because the glycidyl compound has two or more glycidyl groups per molecule, the glycidyl compound can link to two or more acid groups in the latex, and thereby form crosslinks between multiple acid groups in the latex. This can increase the strength of the latex and thereby increase the green body strength of three-dimensional printed green body objects formed using the binder agents described herein.

In some examples, the glycidyl compound can be a non-polymeric small molecule. In some examples, the glycidyl compound can have a molecular weight from about 100 g/mol to about 1,000 g/mol. In other examples, the glycidyl compound can have a molecular weight from about 100 g/mol to about 500 g/mol. In alternative examples, a polymer that includes two or more glycidyl groups can be used as the glycidyl compound. In various examples, the glycidyl group-containing polymer can have a weight average molecular weight within the molecular weight ranges described above. In other examples, the glycidyl group-containing polymer can have a higher molecular weight.

The glycidyl compound can be soluble or dispersible in the binder agent. In some examples, the binder agent can include a liquid vehicle that includes water and an organic co-solvent. The glycidyl compound can be soluble or dispersible in water, or soluble or dispersible in the organic co-solvent, or soluble or dispersible in the combination of water and co-solvent that is used in the liquid vehicle. In some examples, the glycidyl compound may not be soluble or dispersible in water alone, but may be soluble or dispersible in the combination of water and the co-solvent.

The glycidyl compound can be included in the binder agent in an amount that provides an increase in green body strength. In some examples, the glycidyl compound can be included in an amount from about 0.1 wt % to about 25 wt % with respect to the total weight of the binder agent. In other examples, the glycidyl compound can be included in an amount from about 0.1 wt % to about 15 wt %, or from about 0.2 wt % to about 10 wt %, or from about 1 wt % to about 5 wt %.

In some examples, the glycidyl compound can include two or more glycidyl groups attached to an ether or polyether. In certain examples, the compound can include a straight-chained ether or polyether, or a branched ether or polyether. Non-limiting examples of specific glycidyl compounds that can be used are shown in Table 1:

TABLE 1

| Glycidyl Compounds | |
|---|---|
| Compound | Structure |
| Glycerol Diglycidyl Ether | |
| Neopentyl Glycol Diglycidyl | 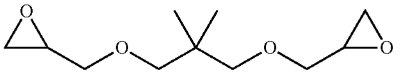 |
| Trimethylolpropane Triglycidyl Ether | 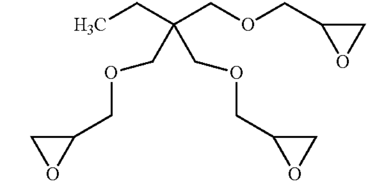 [SMILES: CCC(COCC1CO1)(COCC1CO1)COCC1CO1] |
| Polyethyleneglycol Glycidyl Ether | 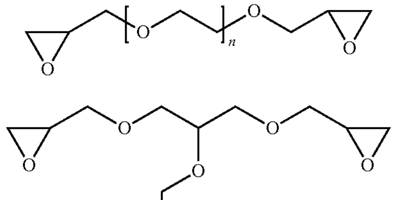 |
| Glycidyl Triglycerol Ether | 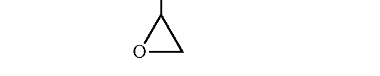 |
| 1,4-Butanediol Diglycidyl Ether | 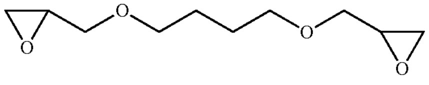 [SMILES: C(CCOCC1CO1)COCC1CO1] 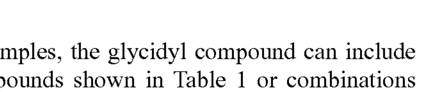 |

In certain examples, the glycidyl compound can include any of the compounds shown in Table 1 or combinations thereof. In some examples, the glycidyl compound can include polyethyleneglycol glycidyl ether. The number of ethoxy units "n" can be from 3 to 10 in some examples, or from 4 to 8 in further examples. In one example, n can be 6.

Latex Particles

To bind the particulate build material together during the build process to form a three-dimensional green body object, binder agent can be applied to the particulate build material on a layer by layer basis. Heat (below metal sintering temperatures) can be applied on a layer by layer basis, upon formation of a plurality of layers of the green body, or in some cases, after the green body is fully formed. The binder agent can include latex particles as a binding agent and an aqueous liquid vehicle. In some examples, the latex particles can include polymerized monomers including a first monomer having an acid group, and a second monomer having a vinyl group and without an acid group. In certain examples, the first monomer can also include a vinyl group, and the monomers can polymerize through addition polymerization.

In certain examples, the first monomer can include acrylic acid, methacrylic acid, itaconic acid, crotonic acid, vinylbenzoic acid, carboxyethyl acrylate, carboxyethyl methacrylate, carboxypropyl acrylate, carboxypropyl methacrylate, or a combination thereof. In these examples, the second monomer can include C1-C20 linear or branched alkyl acrylate, C1-C20 linear or branched alkyl methacrylate, alicyclic acrylate, alicyclic methacrylate, styrene, methyl styrene, polyol acrylate, polyol methacrylate, hydroxyethyl acrylate, hydroxyethyl methacrylate, or a combination thereof.

In further examples, the latex particles can be present based on a total weight of the binder agent at from about 1 wt % to about 20 wt %, from about 1 wt % to about 20 wt %, from about 2 wt % to about 20 wt %, from about 2 wt % to about 15 wt %, or from about 3 wt % to about 10 wt %.

The latex particles can be a polymer that can have different morphologies. In one example, the latex particles can include two different copolymer compositions, which may be fully separated core-shell polymers, partially occluded mixtures, or intimately comingled as a polymer solution. In another example, the latex particles can be individual spherical particles containing polymer compositions of hydrophilic (hard) component(s) and/or hydrophobic (soft) component(s) that can be interdispersed. In one example, the interdispersion can be according to IPN (interpenetrating networks). In yet another example, the latex particles can be composed of a hydrophobic core surrounded by a continuous or discontinuous hydrophilic shell. For example, the particle morphology can resemble a raspberry, in which a hydrophobic core can be surrounded by several smaller hydrophilic particles that can be attached to the core. In yet another example, the latex particles can include 2, 3, or 4 or more relatively large polymer particles that can be attached to one another or can surround a smaller polymer core. In a further example, the latex particles can have a single phase morphology that can be partially occluded, can be multiple-lobed, or can include any combination of any of the morphologies disclosed herein.

In some examples, the latex particles can be heteropolymers or copolymers. As used herein, a heteropolymer can include a hydrophobic component and a hydrophilic component. A heteropolymer can include a hydrophobic component that can include from about 65% to about 99.9% (by weight of the heteropolymer), and a hydrophilic component that can include from about 0.1% to about 35% (by weight of the heteropolymer). In one example, the hydrophobic component can have a lower glass transition temperature than the hydrophilic component.

In some examples, the latex particles can be composed of a polymerization or co-polymerization of acrylic monomers, styrene monomers, or a combination thereof. Example monomers can include, $C_1$-$C_{20}$ linear or branched alkyl (meth)acrylate, alicyclic (meth)acrylate, alkyl acrylate, styrene, methyl styrene, polyol (meth)acrylate, hydroxyethyl (meth)acrylate, (meth)acrylic acid, or a combination thereof. In one specific class of examples, the latex particles can be a styrene (meth)acrylate copolymer. The term "(meth)acrylate" or "(meth)acrylic acid" or the like refers to monomers, copolymerized monomers, etc., that can either be acrylate or methacrylate (or a combination of both), or acrylic acid or methacrylic acid (or a combination of both). In some examples, the terms "(meth)acrylate" and "(meth)acrylic acid" can be used interchangeably, as acrylates and methacrylates are salts and esters of acrylic acid and methacrylic acid, respectively. Furthermore, mention of one compound over another can be a function of pH. Furthermore, even if the monomer used to form the polymer was in the form of a (meth)acrylic acid during preparation, pH modifications during preparation or subsequently when added to an ejectable fluid, such as a binder agent, can impact the nature of the moiety as well (acid form vs. salt or ester form). Thus, a monomer or a moiety of a polymer described as (meth) acrylic acid or as (meth)acrylate should not be read so rigidly as to not consider relative pH levels, ester chemistry, and other organic chemistry concepts. In still another example, the latex particles can include a copolymer with copolymerized methyl methacrylate being present at about 50 wt % or greater, or copolymerized styrene being present at about 50 wt % or greater. Both can be present, with one or the other at about 50 wt % or greater in a more specific example.

In other examples, the latex particles in the binder agent include polymerized monomers of vinyl, vinyl chloride, vinylidene chloride, vinyl ester, acrylate, methacrylate, styrene, ethylene, maleate esters, fumarate esters, itaconate esters, α-methyl styrene, p-methyl styrene, methyl methacrylate, hexyl acrylate, hexyl methacrylate, butyl acrylate, butyl methacrylate, ethyl acrylate, ethyl methacrylate, propyl acrylate, propyl methacrylate, 2-ethylhexyl acrylate, 2-ethylhexyl methacrylate, octadecyl acrylate, octadecyl methacrylate, stearyl methacrylate, vinylbenzyl chloride, isobornyl acrylate, tetrahydrofurfuryl acrylate, 2-phenoxyethyl methacrylate, benzyl methacrylate, benzyl acrylate, ethoxylated nonyl phenol methacrylate, isobornyl methacrylate, cyclohexyl methacrylate, trimethyl cyclohexyl methacrylate, t-butyl methacrylate, n-octyl methacrylate, lauryl methacrylate, trydecyl methacrylate, alkoxylated tetrahydrofurfuryl acrylate, isodecyl acrylate, isobornylmethacrylate, isobornyl acrylate, dimethyl maleate, dioctyl maleate, acetoacetoxyethyl methacrylate, diacetone acrylamide, N-vinyl imidazole, N-vinylcarbazole, N-Vinyl-caprolactam, combinations thereof, derivatives thereof, or mixtures thereof. These monomers include low glass transition temperature (Tg) monomers that can be used to form the hydrophobic component of a heteropolymer.

In other examples, a composition of the latex particles can include acidic monomers. In some examples, the acidic monomer can be a carboxylic acid. In some examples, the acidic monomer content can range from 0.1 wt % to 15 wt %, from 0.5 wt % to 12 wt %, or from 1 wt % to 10 wt % of the latex particles with the remainder of the latex particle being composed of non-acidic monomers. Example acidic monomers can include acrylic acid, methacrylic acid, ethacrylic acid, dimethylacrylic acid, maleic anhydride, maleic acid, vinylsulfonate, cyanoacrylic acid, vinylacetic acid, allylacetic acid, ethylidineacetic acid, propylidineacetic acid, crotonoic acid, fumaric acid, itaconic acid, sorbic acid, angelic acid, cinnamic acid, styrylacrylic acid, citraconic acid, glutaconic acid, aconitic acid, phenylacrylic acid, acryloxypropionic acid, aconitic acid, phenylacrylic acid, acryloxypropionic acid, vinylbenzoic acid, N-vinylsuccinamidic acid, mesaconic acid, methacroylalanine, acryloylhydroxyglycine, sulfoethyl methacrylic acid, sulfopropyl acrylic acid, styrene sulfonic acid, sulfoethylacrylic acid, 2-methacryloyloxymethane-1-sulfonic acid, 3-methacryoyloxypropane-1-sulfonic acid, 3-(vinyloxy)propane-1-sulfonic acid, ethylenesulfonic acid, vinyl sulfuric acid, 4-vinylphenyl sulfuric acid, ethylene phosphonic acid, vinyl phosphoric acid, vinyl benzoic acid, 2-acrylamido-2-methyl-1-propanesulfonic acid, combinations thereof, derivatives thereof, or mixtures thereof. These acidic monomers are higher Tg hydrophilic monomers, than the low Tg monomers above, and can be used to form the hydrophilic component of a heteropolymer. Other examples of high Tg hydrophilic monomers can include acrylamide, methacrylamide, monohydroxylated monomers, monoethoxylated monomers, polyhydroxylated monomers, or polyethoxylated monomers.

In an example, the selected monomer(s) can be polymerized to form a polymer, heteropolymer, or copolymer with a co-polymerizable dispersing agent. The co-polymerizable dispersing agent can be a polyoxyethylene compound, such as a Hitenol® compound (Montello Inc., USA) e.g., polyoxyethylene alkylphenyl ether ammonium sulfate, sodium polyoxyethylene alkylether sulfuric ester, polyoxyethylene styrenated phenyl ether ammonium sulfate, or mixtures thereof. Any suitable polymerization process can be used. In some examples, an aqueous dispersion of latex particles can be produced by emulsion polymerization or co-polymerization of any of the above monomers.

In one example, the latex particles can be prepared by polymerizing high Tg hydrophilic monomers to form the high Tg hydrophilic component and attaching the high Tg hydrophilic component onto the surface of the low Tg hydrophobic component. In another example, the latex particles can be prepared by polymerizing the low Tg hydrophobic monomers and the high Tg hydrophilic monomers at a ratio of the low Tg hydrophobic monomers to the high Tg hydrophilic monomers that ranges from 5:95 to 30:70. In this example, the low Tg hydrophobic monomers can dissolve in the high Tg hydrophilic monomers. In yet another example, the latex particles can be prepared by polymerizing the low Tg hydrophobic monomers, then adding the high Tg hydrophilic monomers. In this example, the polymerization process can cause a higher concentration of the high Tg hydrophilic monomers to polymerize at or near the surface of the low Tg hydrophobic component. In still another example, the latex particles can be prepared by copolymerizing the low Tg hydrophobic monomers and the high Tg hydrophilic monomers, then adding additional high Tg hydrophilic monomers. In this example, the copolymerization process can cause a higher concentration of the high Tg hydrophilic monomers to copolymerize at or near the surface of the low Tg hydrophobic component.

Other suitable techniques, specifically for generating a core-shell structure, can include grafting a hydrophilic shell onto the surface of a hydrophobic core, copolymerizing hydrophobic and hydrophilic monomers using ratios that lead to a more hydrophilic shell, adding hydrophilic monomer (or excess hydrophilic monomer) toward the end of the copolymerization process so there is a higher concentration of hydrophilic monomer copolymerized at or near the surface, or any other method can be used to generate a more hydrophilic shell relative to the core.

In one specific example, the low Tg hydrophobic monomers can be selected from the group consisting of C4 to C8 alkyl acrylate monomers, C4 to C8 alkyl methacrylate monomers, styrene monomers, substituted methyl styrene monomers, vinyl monomers, vinyl ester monomers, and combinations thereof; and the high Tg hydrophilic monomers can be selected from acidic monomers, unsubstituted amide monomers, alcoholic acrylate monomers, alcoholic methacrylate monomers, C1 to C2 alkyl acrylate monomers, C1 to C2 alkyl methacrylate monomers, and combinations thereof. The resulting polymer latex particles can exhibit a core-shell structure, a mixed or intermingled polymeric structure, or some other morphology.

In certain examples, the latex polymer can include polymerized monomer selected from the group consisting of acrylates, methacrylates, styrene, and combinations thereof, and polymerized acid monomer selected from the group consisting of acrylic acid, methacrylic acid, and a combination thereof. In a particular example, the latex polymer can include a styrene (meth)acrylate copolymer.

In some examples, the latex polymer can have a weight average molecular weight (Mw) that can range from about 5,000 Mw to about 2,000,000 Mw. In yet other examples, the weight average molecular weight can range from about 100,000 Mw to about 1,000,000 Mw, from about 100,000 Mw to about 500,000 Mw, from about 150,000 Mw to about 300,000 Mw, or from about 50,000 Mw to about 250,000 Mw. Weight average molecular weight (Mw) can be measured by Gel Permeation Chromatography with polystyrene standard.

In some examples, the latex polymer particles can be latent and can be activated by heat (applied iteratively or after green body formation). In these instances, the activation temperature can correspond to the minimum film formation temperature (MFFT) or a glass transition temperature (Tg) which can be greater than ambient temperature. As mentioned herein, "ambient temperature" may refer to room temperature (e.g., ranging about 18° C. to about 22° C.). In one example, the latex polymer particles can have a MFFT or Tg that can be about 15° C. or more greater than ambient temperature. In another example, the MFFT or the Tg of the bulk material (e.g., the more hydrophobic portion) of the latex polymer particles can range from about 25° C. to about 200° C. In another example, the latex particles can have a MFFT or Tg ranging from about 40° C. to about 120° C. In yet another example, the latex polymer particles can have a MFFT or Tg ranging from about 50° C. to about 150° C. In a further example, the latex polymer particles can have a Tg that can range from about −20° C. to about 130° C., or in another example from about 60° C. to about 105° C. At a temperature above the MFFT or the Tg of a latent latex polymer particle, the polymer particles can coalesce and can bind materials.

The latex particles can have a particle size that can be jetted via thermal ejection or printing, piezoelectric ejection or printing, drop-on-demand ejection or printing, continuous ejection or printing, etc. In an example, the particle size of the latex particles can range from about 10 nm to about 400 nm. In yet other examples, a particle size of the latex particles can range from about 10 nm to about 300 nm, from about 50 nm to about 250 nm, from about 100 nm to about 300 nm, or from about 25 nm to about 250 nm.

In the various binder agents described herein, these fluids can be aqueous fluids, and can include liquid vehicle ingredients, such as water, organic co-solvents, biocides, viscosity modifiers, pH adjusters, sequestering agents, preservatives, latex polymer, etc. More detail regarding the liquid vehicles that can be used is provided hereinafter.

Particulate Build Materials

In examples of the three-dimensional printing kits and methods disclosed herein, the build material can include any particulate build material that includes from about 80 wt % to about 100 wt % metal particles based on the total weight of the particulate build material. In other examples, the metal particles can be present in the particulate build material at from about 90 wt % to about 100 wt %, from about 95 wt % to about 100 wt %, or at about 100 wt %. In an example, the build material particles can be a single phase metallic material composed of one element. In this example, the fusing temperature may be below the melting point of the single element. In another example, the build material particles can include two or more elements, which may be in the form of a single phase metallic alloy or a multiple phase metallic alloy. In these other examples, fusing can occur over a range of temperatures. With respect to alloys, materials with a metal alloyed to a non-metal (such as a metal-metalloid alloy) can be used as well.

In some examples, the particulate build material can include particles of aluminum, titanium, copper, cobalt, chromium, nickel, vanadium, tungsten, tungsten carbide, tantalum, molybdenum, magnesium, gold, silver, ferrous alloy, stainless steel, steel, alloys thereof, or admixtures thereof. Specific alloy examples can include AlSi 10 Mg, 2xxx series aluminum, 4xxx series aluminum, CoCr MP1, CoCr SP2, maraging steel MS1, hastelloy C, hastelloy X, nickel alloy HX, inconel IN625, inconel IN718, stainless steel GP1, stainless steel 17-4PH, stainless steel 316L, stainless steel 430L titanium 6Al4V, titanium 6Al-4V ELI7, or a mixture thereof.

The temperature(s) at which the metallic particles of the particulate build material fuse together is/are above the temperature of the environment in which the patterning portion of the three-dimensional printing method is performed, e.g., patterning at from about 18° C. to about 300° C. and fusing at from about 600° C. to about 3,500° C. In some examples, the metallic build material particles may have a melting point ranging from about 600° C. to about 3,500° C. In other examples, the metallic build material particles may be an alloy having a range of melting points. In certain examples, the three-dimensional green body object can be fused at a peak temperature from about 1,000° C. to about 2,000° C. for a period of time from about 10 hours to about 30 hours to sinter the metal particles together.

The particle size of the particulate build material can be similarly sized compared to the latex particles described above, or differently sized. In some examples, the particulate build material can have a larger particle size than the latex particles. In one example, the D50 particle size of the particulate build material can range from 0.5 μm to 200 μm. In some examples, the particles can have a D50 particle size distribution value that can range from about 1 μm to about 150 μm, from about 1 μm to about 100 μm, from about 1 μm to about 50 μm, from about 4 μm to about 150 μm, from about 4 μm to about 100 μm, from about 4 μm to about 50 μm, etc. Individual particle sizes can be outside of these ranges, as the "D50 particle size" is defined as the particle size at which about half of the particles are larger than the D50 particle size and about half of the other particles are smaller than the D50 particle size (by weight based on the metal particle content of the particulate build material). As used herein, particle size refers to the value of the diameter of spherical particles or in particles that are not spherical can refer to the longest dimension of that particle. The shape of the particles of the particulate build material can be spherical, non-spherical, random shapes, or a combination thereof. The particle size can be presented as a Gaussian distribution or a Gaussian-like distribution (or normal or normal-like distribution). Gaussian-like distributions are distribution curves that may appear Gaussian in their distribution curve shape, but which can be slightly skewed in one direction or the other (toward the smaller end or toward the larger end of the particle size distribution range). That being stated, an example Gaussian-like distribution of the metal particles can be characterized using "D10," "D50," and "D90" particle size distribution values, where D10 refers to the particle size at the $10^{th}$ percentile, D50 refers to the particle size at the $50^{th}$ percentile, and D90 refers to the particle size at the $90^{th}$ percentile. For example, a D50 value of 25 μm means that 50% of the particles (by number) have a particle size greater than 25 μm and 50% of the particles have a particle size less than 25 μm. Particle size distribution values may not be related to Gaussian distribution curves, but in one example of the present disclosure, the metal particles can have a Gaussian distribution, or more typically a Gaussian-like distribution with offset peaks at about D50. In practice, true Gaussian distributions are not typically present, as some skewing can be present, but still, the Gaussian-like distribution can be considered to be referred to as "Gaussian" as typically used.

Definitions

It is noted that, as used in this specification and the appended claims, the singular forms "a," "an," and "the" include plural referents unless the content clearly dictates otherwise.

The term "about" as used herein, when referring to a numerical value or range, allows for a degree of variability in the value or range, for example, within 10%, or, in one aspect within 5%, of a stated value or of a stated limit of a range. The term "about" when modifying a numerical range is also understood to include as one numerical subrange a range defined by the exact numerical value indicated, e.g., the range of about 1 wt % to about 5 wt % includes 1 wt % to 5 wt % as an explicitly supported sub-range.

As used herein, the term "green" when referring to a green part, green body, three-dimensional green body object, green body layer, etc. refers to any intermediate structure that has been solidified and/or cured (prior to sintering), furthermore, a green body object can include particulate build material and latex particles. The latex particles can be used to bind the particulate build material together. The term "green body" is used to refer to a multi-layered object that is (weakly) bound together, but upon some water removal, can exhibit sufficient tensile strength to be moved to a sintering oven, for example. It is to be understood that any build material that is not patterned with binder agent is not considered to be part of the green body, even if it is adjacent to or surrounds the green body. For example, unprinted particulate build material acts to support the green body while contained therein, but the particulate build material is not part of the green body unless it is printed with binder agent to generate a solidified part prior to sintering.

As used herein, the terms "three-dimensional part," "three-dimensional object," or the like, refers to the target three-dimensional object that is being built, and can be a green body three-dimensional object or a fused three-dimensional object, depending on the context. However, in some instances, for clarity, the three-dimensional object can be referred to as a "fused" three-dimensional object, indicating it has been fused, e.g., sintered, annealed, melted, etc., or a "green body," "three-dimensional green body object," or "green" three-dimensional object, indicating it has been solidified or in the process of solidification sufficient for movement, but not yet heat fused.

"Binder agent" refers to a fluid that includes water and latex particles that are effective for binding layers of particulate build material when forming a green body. The binder agent is typically applied to form a three-dimensional green body object.

The term "fluid" does not infer that the composition is free of particulate solids, but rather, can include solids dispersed therein, including carbon black pigment, latex particles, or other solids that are dispersed in the liquid vehicle of the fluid.

As used herein, "kit" can be synonymous with and understood to include a plurality of compositions where the different compositions can be separately contained in separate containers prior to and/or during use, e.g., building a green three-dimensional object for subsequent sintering. These compositions of the "kit" can be combined together during a three-dimensional build process. The containers can be any type of a vessel, box, or receptacle made of any material.

The term "fuse," "fusing," or the like refers to the joining of the material of adjacent particles of a particulate build material, such as by sintering, annealing, melting, or the like, and can include a complete fusing of adjacent particles into a common structure, e.g., melting together, or can include surface fusing where particles are not fully melted to a point of liquefaction, but which allow for individual particles of the particulate build material to become bound to one another, e.g., forming material bridges between particles at or near a point of contact. This is not to be confused with curing of the latex binder, in which the latex particles may coalesce together and solvent can evaporate out of the binder, but after which the metal particles remain separate one from another.

As used herein, a plurality of items, structural elements, compositional elements, and/or materials may be presented in a common list for convenience. However, these lists should be construed as though the various members of the list are individually identified as a separate and unique member. Thus, no individual member of such list should be construed as a de facto equivalent of any other member of the same list based on their presentation in a common group without indications to the contrary.

Concentrations, dimensions, amounts, and other numerical data may be presented herein in a range format. It is to be understood that such range format is used merely for convenience and brevity and should be interpreted flexibly to include the numerical values explicitly recited as the limits of the range, as well as to include all the individual numerical values or sub-ranges encompassed within that range as if the various numerical values and sub-ranges are explicitly recited. For example, a weight ratio range of about 1 wt % to about 20 wt % should be interpreted to include the explicitly recited limits of 1 wt % and 20 wt % and to include individual weights such as about 2 wt %, about 11 wt %, about 14 wt %, and sub-ranges such as about 10 wt % to about 20 wt %, about 5 wt % to about 15 wt %, etc.

EXAMPLES

The following illustrates examples of the present disclosure. However, it is to be understood that the following are illustrative of the application of the principles of the present disclosure. Numerous modifications and alternative compositions, methods, and systems may be devised without departing from the spirit and scope of the present disclosure. The appended claims are intended to cover such modifications and arrangements.

Example 1—Preparation of Binder Agents

To evaluate the tensile strength of various binder agents, the following binder agent formulations 1 through 11 were prepared. The binder agent compositions included the following identical ingredients: 26 wt % 1,2-butanediol as an organic co-solvent, 1 wt % Surfynol® 2502 surfactant (available from Evonik, Germany), and 0.4 wt % cyan dye. The binder agent compositions also included 1.5 wt % of one of 6 different glycidyl compounds (or no glycidyl compound in the comparative formulations 1 and 8). The binder agent compositions also included 12 wt % either Latex A or Latex B. Latex A was a 31.4% solids dispersion of a copolymer of styrene, methyl methacrylate, and butyl acrylate with 1 wt % methacrylic acid. Latex B was a 32.4% solids dispersion of a copolymer of styrene, methyl methacrylate, and butyl acrylate with 3 wt % methacrylic acid. Both latexes had a glass transition temperature of about 90° C. and an average particle size of about 200 nm. The cyan dye was included to allow for visual assurance that the binder agents were mixed thoroughly with the metal particles during testing. In addition to the 1,2-butanediol, surfactant, cyan dye, glycidyl compound, and latex, the binder agents include water for the remaining balance. Table 2 shows the types of glycidyl compound and latex used in the binder agents.

TABLE 2

| Binder Agents | | |
|---|---|---|
| Binder Agent | Latex | Glycidyl Compound |
| 1 (comparative) | A | None |
| 2 | A | Glycerol Diglycidyl Ether |
| 3 | A | Neopentyl Glycol Diglycidyl |
| 4 | A | Trimethylolpropane Triglycidyl Ether |
| 5 | A | Polyethyleneglycol Glycidyl Ether (n = 6) |
| 6 | A | Glycidyl Triglycerol Ether |
| 7 | A | 1,4-Butanediol Diglycidyl Ether |
| 8 (comparative) | B | None |
| 9 | B | Glycerol Diglycidyl Ether |
| 10 | B | Trimethylolpropane Triglycidyl Ether |
| 11 | B | Glycidyl Triglycerol Ether |

Example 2—Tensile Strength

Figure 4:
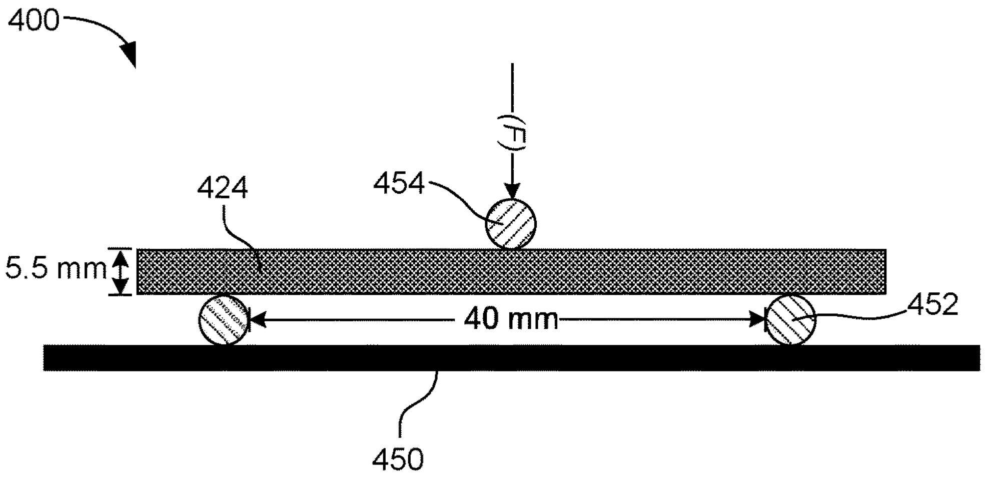
FIG. 4 illustrates an example tensile strength apparatus that can be used to evaluate tensile strength provided by various compositions for use in three-dimensional printing in accordance with the present disclosure.

Off-line tensile strength testing was conducted, as shown at 400 in FIG. 4, where the binder agents prepared in accordance with Table 2 were used to prepare press bar samples 424, which were solidified green body samples such as shown in FIG. 2. The individual press bar samples included particulate build material with 100 wt % stainless steel particles having a D50 particle size of about 7 μm admixed with the various binder agents of Table 2. To prepare the individual samples for tensile strength testing, a mixture of the stainless steel particles and various binder agents were mixed in a high speed mixer to ensure homogenous mixing at a weight ratio of about 19:1 (94.8 g stainless steel particles; 5.2 g binder agent; with 1 g of water added to aid in mixing) and then the wet particles/binder homogenous mixture was dried in a vacuum oven at 30° C. for two hours to remove 80-85% of the water content, leaving a dried homogenous mixture of binder solids and stainless steel particles. 18 g of the dried homogenous mixture was poured into the opening of a press bar mold and pressed under 2000 psi for 30 seconds to form the respective press bar samples. The dimension of the press bar samples, shown at 424 in FIG. 4, was 50 mm (length) by 12 mm (width) by 5.5 mm (thickness). The individual press bar samples were then carefully separated from the mold and cured in a vacuum oven at 150° C. at 22-25 in Hg for 30 minutes with a slow stream of air to provide for removal of solvents and some or even full curing of latex binder. The individual cured press bar samples were then cooled and submitted to a 3-point bend Instron® tester, as shown by example in FIG. 4, to measure their tensile strength. The Instron® tester, available from Instron (USA), included a support 450, supporting pins 452, and a loading pin 454 which applied increasing force (F) to the individual press bar samples until the samples failed (broke under force). For the various individual press bar samples, five or more press bars were made and the average maximum tensile stress (mPa) was reported. The average data are provided in Table 3.

TABLE 3

Average Maximum Tensile Stress of Cured Press Bar Samples

| Agent No. | Max Stress (mPa) |
|---|---|
| 1 (comparative) | 3.81 |
| 2 | 5.99 |
| 3 | 4.02 |
| 4 | 4.87 |
| 5 | 3.84 |
| 6 | 6.15 |
| 7 | 4.90 |
| 8 (comparative) | 3.94 |
| 9 | 6.30 |
| 10 | 5.25 |
| 11 | 6.53 |

As can be seen from Table 3, the addition of glycidyl compounds increased the strength of the press bars in every example compared to the comparative examples that had no glycidyl compound. Some of the glycidyl compounds appear to increase the strength more than others. Examples 6, 9, and 11 in particular had nearly double the strength of the press bars without glycidyl compounds. These results show that adding a small amount (1.5 wt %) of a glycidyl compound to the binder agent can produce a significant increase in green body strength for three-dimensional green body objects formed with the binder agents. Although the tests performed were offline tests (i.e., not using a three-dimensional printing system), it is expected that the binder agent formulations can be used in a three-dimensional printing system to produce three-dimensional green body objects with similarly increased strength.

What is claimed is:

1. A binder agent for printing a three-dimensional green body object, the binder agent consisting of:
- water;
- from about 20 wt % to about 40 wt % of a single organic co-solvent, wherein the single organic co-solvent is 1,2-butanediol;
- a glycidyl compound having two or more glycidyl groups per molecule;
- latex particles consisting of polymerized monomers, wherein the polymerized monomers consist of:
  - a first monomer having an acid group;
  - a second monomer that is a styrene monomer; and
  - a third monomer selected from the group consisting of an acrylate, a methacrylate, and a combination thereof,
  - wherein:
    - the second and third monomers make up a hydrophobic component of the latex particles, and wherein latex particles have a hydrophobic component content ranging from 85 wt % to 99.9 wt %; and
    - the latex particles have i) a first monomer content ranging from 0.1 wt % to 15 wt % and ii) a hydrophobic component content ranging from 85 wt % to about 99.9 wt %; and
- optionally an additive selected from the group consisting of a surfactant, a biocide, an anti-kogation agent, and combinations thereof.

2. The binder agent of claim 1, wherein the glycidyl compound has a molecular weight ranging from about 100 g/mol to about 1,000 g/mol.

3. The binder agent of claim 1, wherein the glycidyl compound is selected from the group consisting of glycerol diglycidyl ether, neopentyl glycol diglycidyl, trimethylolpropane triglycidyl ether, polyethylene glycidyl ether, glycidyl triglycerol ether, 1,4-butanediol diglycidyl ether, and a combination thereof.

4. The binder agent of claim 1, wherein the glycidyl compound is present in an amount ranging from about 0.1 wt % to about 25 wt % with respect to a total weight of the binder agent.

5. The binder agent of claim 1, wherein the first monomer is selected from the group consisting of acrylic acid, methacrylic acid, itaconic acid, and a combination thereof.

6. The binder agent of claim 1, wherein the latex particles are present in an amount ranging from about 1 wt % to about 20 wt %.

7. The binder agent of claim 1, wherein the single organic co-solvent is present in the binder agent in an amount of from about 26 wt % to about 30 wt %.

8. The binder agent of claim 1, wherein:
- the single organic co-solvent is present in an amount of 26 wt %; and
- the glycidyl compound is present in an amount of 1.5 wt %.

9. The binder agent of claim 1, wherein the glycidyl compound is selected from the group consisting of glycerol diglycidyl ether and glycidyl triglycerol ether.

10. The binder agent of claim 1 wherein the third monomer is selected from the group consisting of carboxyethyl acrylate, carboxyethyl methacrylate, carboxypropyl acrylate, carboxypropyl methacrylate, and a combination thereof.

11. A binder agent for printing a three-dimensional green body object, the binder agent consisting of:
- water;
- from about 20 wt % to about 40 wt % of a single organic co-solvent, wherein the single organic co-solvent is 1,2-butanediol;
- a glycidyl compound having two or more glycidyl groups per molecule;
- latex particles selected from the group consisting of i) a 31.4% solids dispersion of a copolymer of styrene, methyl methacrylate, and butyl acrylate with 1 wt % methacrylic acid and ii) a 32.4% solids dispersion of a copolymer of styrene, methyl methacrylate, and butyl acrylate with 3 wt % methacrylic acid; and
- optionally an additive selected from the group consisting of a surfactant, a biocide, an anti-kogation agent, and combinations thereof.

12. A three-dimensional printing kit, comprising:
- a particulate build material comprising from about 80 wt % to about 100 wt % of metal particles; and
- the binder agent of claim 1.

13. The three-dimensional printing kit of claim 12, wherein the metal particles are selected from the group consisting of aluminum particles, titanium particles, copper particles, cobalt particles, chromium particles, nickel particles, vanadium particles, tungsten particles, tungsten carbide particles, tantalum particles, molybdenum particles, magnesium particles, gold particles, silver particles, particles of a ferrous alloy, stainless steel particles, steel particles, and an admixture thereof.

14. The three-dimensional printing kit of claim 12, wherein the metal particles have a D50 particle size of from about 4 μm to about 150 μm.

15. The three-dimensional printing kit of claim 12, wherein the glycidyl compound is selected from the group consisting of glycerol diglycidyl ether, neopentyl glycol diglycidyl, trimethylolpropane triglycidyl ether, polyethylene glycidyl ether, glycidyl triglycerol ether, 1,4-butanediol diglycidyl ether, and a combination thereof.

16. The three-dimensional printing kit of claim 12, wherein the glycidyl compound is present in an amount ranging from about 0.1 wt % to about 25 wt % with respect to a total weight of the binder agent.

17. A method of three-dimensional printing, comprising:

iteratively applying individual build material layers of a particulate build material comprising from about 80 wt % to about 100 wt % of metal particles;

based on a three-dimensional object model, selectively applying a binder agent to the individual build material layers to define layers of a three-dimensional green body object, the binder agent consisting of:

water;

from about 20 wt % to about 40 wt % of a single organic co-solvent, wherein the single organic co-solvent is 1,2-butanediol;

a glycidyl compound having two or more glycidyl groups per molecule;

latex particles consisting of polymerized monomers, wherein the polymerized monomers consist of:

a first monomer having an acid group;

a second monomer that is a styrene monomer; and a third monomer selected from the group consisting of an acrylate, a methacrylate, and a combination thereof, wherein:

the second and third monomers make up a hydrophobic component of the latex particles, and wherein latex particles have a hydrophobic component content ranging from 85 wt % to 99.9 wt %; and the latex particles have i) a first monomer content ranging from 0.1 wt % to 15 wt % and ii) a hydrophobic component content ranging from 85 wt % to 99.9 wt %; and optionally an additive selected from the group consisting of a surfactant, a biocide, an anti-kogation agent, and combinations thereof; and heating the three-dimensional green body object to drive off water and further solidify the three-dimensional green body object.

18. The method of claim 17, wherein the glycidyl compound is selected from the group consisting of glycerol diglycidyl ether, neopentyl glycol diglycidyl, trimethylolpropane triglycidyl ether, polyethylene glycidyl ether, glycidyl triglycerol ether, 1,4-butanediol diglycidyl ether, and a combination thereof.

19. The method of claim 17, wherein the heating comprises heating at a temperature ranging from about 100° C. to about 250° C. for about 5 minutes to about 8 hours.

20. The method of claim 17, further comprising fusing the three-dimensional green body object in a fusing oven at a peak temperature from about 600° C. to about 3,5000° C. for a period of time from about 1 hour to about 30 hours to fuse the metal particles together.

* * * * *